United States Patent [19]
Kaser et al.

[11] 4,091,331
[45] May 23, 1978

[54] ARRANGEMENT FOR COMPENSATING CARRIER PHASE ERRORS IN A RECEIVER FOR DISCRETE DATA VALUES

[75] Inventors: Hans-Peter Kaser, Thalwil, Switzerland; Philippe Thirion, St. Paul de Vence, France; Gottfried Ungerböck, Adliswil, Switzerland

[73] Assignee: International Business Machines Corporation, Armonk, N.Y.

[21] Appl. No.: 753,387

[22] Filed: Dec. 22, 1976

[30] Foreign Application Priority Data

Dec. 31, 1975 Switzerland .................. 16930/75

[51] Int. Cl.$^2$ .................. H03D 3/00; H04L 27/22
[52] U.S. Cl. .................. 329/110; 325/320; 325/349; 329/136; 329/168

[58] Field of Search .............. 329/104, 105, 110, 136, 329/168, 178; 325/320, 344, 349

[56] References Cited

U.S. PATENT DOCUMENTS

| 3,855,539 | 12/1974 | Croisier | 329/104 |
| 3,972,000 | 7/1976 | Desblache et al. | 329/105 |

*Primary Examiner*—Siegfried H. Grimm
*Attorney, Agent, or Firm*—John B. Frisone

[57] ABSTRACT

In a receiver for PSK modulated signals, carrier phase tracking is achieved by a feedback loop comprising a phase error predictor. Means are provided for adaptively setting the gain factor in the phase error predictor to an optimum value, in response to successive residual phase errors.

6 Claims, 5 Drawing Figures

ARRANGEMENT FOR COMPENSATING CARRIER PHASE ERRORS IN A RECEIVER FOR DISCRETE DATA VALUES

BACKGROUND OF THE INVENTION

The present invention is concerned with an arrangement for compensating carrier phase errors in a receiver for discrete data values which were transmitted by modulating a carrier at discrete clock times.

SUMMARY OF THE INVENTION

Phase shift keying (PSK) is presently used in many systems for data transmission wherein for representing N discrete data values, N different phase values are used by which a carrier signal is modulated at given clock times. The data values can also be represented by complex values equally distributed on the unit circle. A complex carrier is pulse amplitude modulated, whereafter only the real part is transmitted. A representation using complex signals for transmission systems with carrier modulation leads to a brief and clear mathematical description. In a technical implementation, however, pairs of real signals are used preferably instead of complex signals, said real signals being related with other real or complex signals according to complex number calculus.

Assuming error-free transmission, the transmitted discrete values would be obtained at the receiver after demodulation based on two carrier waves shifted by 90° with respect to each other, by which a complex baseband signal is generated, at sampling instants which were suitably derived. Since disturbances of various kinds always occur during transmission, such as signal distortion, additive noise, frequency shift, and carrier phase jitter, suitable means for error compensation must be provided in the receiver. It is known in the art to use equalizers for eliminating signal distortions. Some of these can adapt their characteristics to varying distortion conditions. One can provide feedback loops for compensating phase/frequency shift and carrier phase jitter, comprising means for deriving a phase correcting value from the residual error.

Corresponding U.S. Pat. No. 3,972,000 issued July 27, 1976, uses prediction filters in the feedback loop of a decision circuit for phase error reduction. Such filters can be adjusted to provide optimum performance if the conditions causing the disturbances during transmission and thus the statistical character of the resulting errors are known. Depending on whether phase jitter or additive noise are the predominant disturbances, a large or a small gain factor must be used in the loop.

The prior art arrangements have the disadvantage of not operating optimally if the ratio between phase jitter and noise varies, be it due to changing conditions on a given transmission link, or due to use of different transmission links. This is due to the fact that in known devices the gain factor in the correction feedback loop generally is set to a fixed value and therefore will be optimum only for a particular phase-jitter-to-noise ratio.

OBJECTS AND THE INVENTION

It is an object of the invention to provide an arrangement for automatically setting the gain factor in a carrier phase tracking loop which operates effectively for constant as well as for varying disturbance conditions.

It is a further object of the invention to devise an arrangement for determining the phase tracking loop gain factor in an adaptive manner, depending on the ratio between carrier phase jitter and additive noise.

It is another object of the invention to provide means for gain factor determination which have a simple design and require only a few additional elements for achieving an optimum gain factor setting the error-compensating feedback loop (phase tracking loop).

The background of the present invention and the principles of the disclosed embodiments will first be explained briefly in connection with FIGS. 1 and 2.

Figure 1:
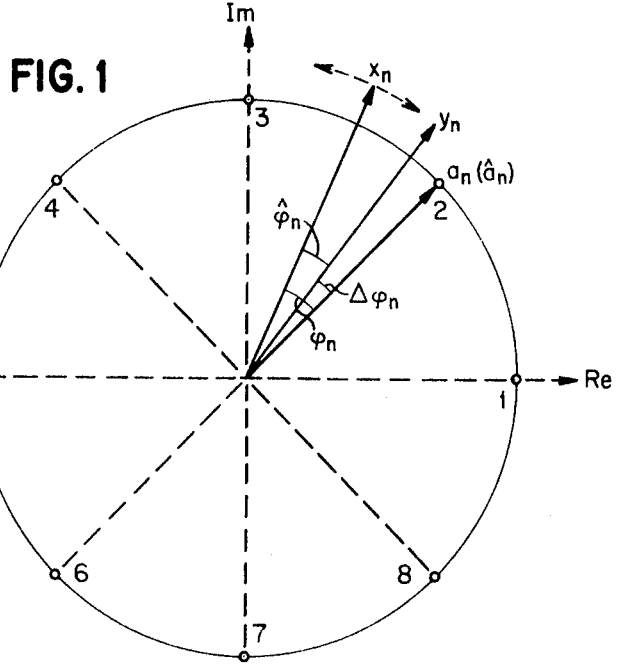
FIG. 1 is a phase diagram for illustrating the discrete states and the occurring errors in phase shift keying modulation with eight phases (8-PSK)

FIG. 1 shows a signal diagram representing the eight possible discrete states of the signal parameter in an eight-phase transmission system. Each of the eight different states, designated 1 through 8 in FIG. 1, could represent a different three-bit code word. Each state corresponds to a complex value or "pulse amplitude" which can be represented either as $a_n = \exp(j\phi_n)$ or as $a_n = a_{Rn} + ja_{In}$, $a_{Rn}$ being termed the inphase component and $a_{In}$ the quadrature component.

The system considered is time-discrete, i.e., the discrete values of the signal parameter are defined only for given "sampling times," occurring periodically with period T.

In a transmitter, a carrier signal, e.g., a sinusoidal wave, is modulated at each sampling time by one of the eight discrete complex pulse amplitudes, $a_n$ (as shown in FIG. 1). This may be effected by modulating a complex carrier $\exp(j\omega_c t)$ by a complex value and transmitting the real part thereof: $Re[a_n \cdot \exp(j\omega_c t)]$.

Figure 2:
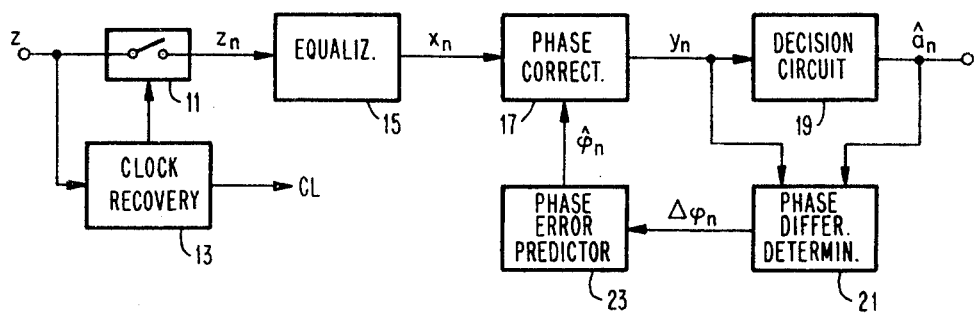
FIG. 2 is a block diagram of a receiver (without a demodulator stage) for recovering discrete data values which were transmitted by modulating a carrier at discrete times.

As shown in FIG. 2, in a receiver after demodulation, a complex signal $z$ (inphase and quadrature components) must be sampled by sampling means 11 at intervals T, the sampling times being determined by clock recovery means 13 (which also provide clock signals CL for other units). From the sample values $z_n$ thus obtained, the received pulse amplitudes $\hat{a}_n$ must be determined for recovering the transmitted information. A decision circuit 19 is provided for this purpose. However, a signal is subjected to several disturbances during its transmission, depending on the characteristics of the transmission medium (signal distortion, additive noise, phase jitter).

Signal distortion can be compensated by an equalizer 15 (here operating in discrete time) to obtain an improved signal $x_n$, as shown in FIG. 1. However, this signal is still disturbed by phase jitter and additive noise which must be reduced to the largest possible extent to allow correct pulse amplitude determination.

To allow carrier phase tracking a phase correction device 17 is provided to decrease phase error $\phi_n$ by subtracting an estimated phase error value $\hat{\phi}_n$. Thus, signal value $y_n = x_n \cdot \exp(-j\hat{\phi}_n)$ is obtained, which still has a residual phase error $\Delta\phi_n$. A phase error predictor 23 generates the estimated phase error value $\hat{\phi}_{n+1}$ from the residual phase error $\Delta\phi_n$, which is provided by phase difference determination means 21. This arrangement constitutes a phase-locked loop for carrier-phase tracking.

A decision circuit 19 finally determines the output value $\hat{a}_n$ from $y_n$ by selecting the one of the eight discrete pulse amplitudes which is closest to $y_n$. Phase difference determinator 21 receives both $y_n$ and $\hat{a}_n$ and furnishes the value of the residual phase error $\Delta\phi_n$ as input to the phase error predictor 23. In good approximation, $\Delta\phi_n$ is obtained from $\Delta\phi_n = Im(y_n \cdot \hat{a}_n)$, assuming that $|y_n| \cdot |a_n| \approx 1$. (Note that the quantities $\phi_n$, $\hat{\phi}_n$ and $\Delta\phi_n$ are real valued in contrast to the complex-valued quantities $a_n$, $z_n$, $x_n$, $y_n$, and $\hat{a}_n$).

Receivers of the type shown in FIG. 2 are known in the art. The state of the art is represented, e.g., by: a paper by H. Kobayashi, "Simultaneous Adaptive Estimation and Decision Algorithm for Carrier Modulated Data Transmission Systems," published in IEEE Transactions on Communications, June, 1971, pp. 268–280; and U.S. Pat. Nos. 3,855,539 and previously-mentioned 3,972,000.

Figure 3:
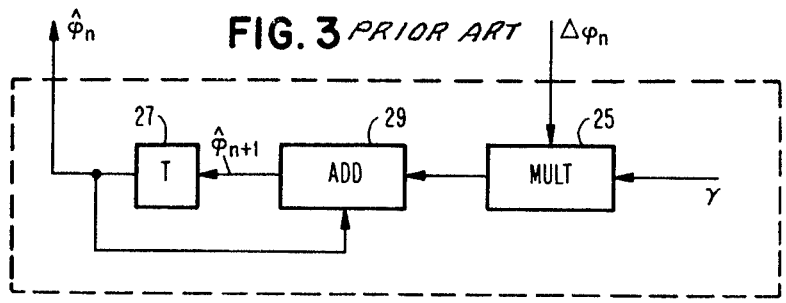
FIG. 3 illustrates in block form the details of a state-of-the-art phase error predictor in a receiver according to FIG. 2.

The circuit illustrated in FIG. 3 provides the function of phase corrector 17, decision circuit 19, as well as phase difference determination means 21 and phase error predictor 23 for obtaining values $\hat{a}_n$ from equalizer sampling values $x_n$, i.e., for carrier phase tracking and symbol detection, and was briefly described in a paper by G. Ungerböck, published in Proceedings of the National Telecommunications Conference 1974 (NTC 74), pp. 734–738. This arrangement with a feedback path for obtaining a predicted value $\hat{\phi}_n$ is a decision-directed phase-locked loop.

It comprises a multiplier 25 in which the residual phase error $\Delta\phi_n$ is multiplied by a given factor $\gamma$. The weighted residual phase errors $\gamma \cdot \Delta\phi_n$ are accumulated in an arrangement consisting of a delay element 27 having a delay time of one sampling period T, and of an adder 29 to obtain $\hat{\phi}_{n+1} = \hat{\phi}_n + \gamma \cdot \Delta\phi_n$.

The invention is an improvement of this arrangement in which the factor $\gamma$ is adaptively derived. Before describing an embodiment of the invention, some theoretical explanations will be given to show why and how the improvement is possible for the filter in the decision-directed phase-locked loop.

It is assumed that the disturbances still present in $x_n$, i.e., after equalization, are mainly carrier-phase jitter and white noise. This can be written as $$x_n = a_n \cdot \exp(j\phi_n) + w_n \quad (1)$$

with $a_n$ = transmitted pulse amplitude (complex); $\phi_n$ = phase jitter (real), and $w_n$ = additive white noise (complex). It is sufficient to describe the phase-jitter process in first approximation as a process with independent Gaussian increments (Wiener process):

$$\phi_n = \phi_{n-1} + V_n \quad (2)$$

where $v_n$ = Gaussian increment.

The optimum value of gain $\gamma$ in the loop filter of FIG. 3 depends on the ratio between phase jitter and noise. A phase-jitter-to-noise ratio $$\alpha = \frac{\sigma_v^2}{\sigma_w^2} \quad (3)$$

can be defined with $\sigma_v^2$ = variance of the increments of the phase jitter, and $\sigma_w^2$ = variance of the noise (real and imaginary components being statistically equivalent).

For a given value of $\alpha$ the optimum loop gain $\gamma$ can be shown to be $$\gamma_{opt} = \frac{-\alpha}{2} + \left(\frac{\alpha^2}{4} + \alpha\right)^{\frac{1}{2}} \quad (4)$$

From this equation it follows that if there is no phase jitter, i.e., if $\alpha = 0$, $\gamma_{opt} = 0$. If, however, phase jitter is dominant disturbance, i.e., if $\alpha \to \infty$, then $\gamma_{opt} = 1$. Hence, $0 \leq \gamma_{opt} \leq 1$.

If the phase-jitter-to-noise ratio were known in advance, the optimum value for $\gamma$ could be determined and the filter in the feedback loop (phase predictor) could be set to the value. In most applications, however, the ratio $\alpha$ is not known in advance. In fact, it may vary during transmission. Thus, the selection of $\gamma$ should be made adaptive.

Loop gain $\gamma$ must be adjusted so that the mean square error $$E[(\phi_n - \hat{\phi}_n)^2] = E[(\alpha\phi_n)^2] \quad (5)$$

is minimized (with $E$ = mathematical expectation).

Mathematically, this can be achieved by using the stochastic gradient algorithm (without averaging of increments):

$$\gamma^{(n)} = \gamma^{(n-1)} - \frac{\epsilon}{2} \frac{\delta(\Delta\phi)_n^2}{\delta\gamma} \quad (6)$$

$$\gamma^{(n)} = \gamma^{(n-1)} - \epsilon\Delta\phi_n \frac{\delta\Delta\phi_n}{\delta\gamma}$$

with $\epsilon > 0$, but small. Specifying a time index for $\gamma$ is not necessary in most of the expressions presented, because $\gamma$ will vary only slowly during its adaptation. For the loop filter (of first order) shown in FIG. 3, the predicted phase value is $$\hat{\phi}_n = \hat{\phi}_{n-1} + \gamma \cdot \Delta\phi_{n-1}. \quad (7)$$

Using $\phi_k = \hat{\phi}_k + \Delta\phi_k$, this can be rewritten as $$\Delta\phi_n = (1 - \gamma)\Delta\phi_{n-1} + (\phi_n - \phi_{n-1}). \text{ TM (8)}$$

Because only $\Delta\phi_k$ but not $\phi_k$ (for arbitrary $k$) depends on $\gamma$, differentiating with respect to $\gamma$ yields $$\frac{\delta\Delta\phi_n}{\delta\gamma} = (1 - \gamma)\frac{\delta\Delta\phi_{n-1}}{\delta\gamma} - \Delta\phi_{n-1} \quad (9)$$

which permits computing $$\frac{\delta\Delta\phi_n}{\delta\gamma}$$

recursively from $\Delta\phi_{n-1}$. Equations (6) and (9) together specify the gain adjustment circuitry 31 shown in FIG. 4, wherein the optimum value of $\gamma$ must be within the interval [0, 1]. A limiter circuit 53 has been added in order to ensure that the value of $\gamma$ will always stay in this region.

Figure 4:
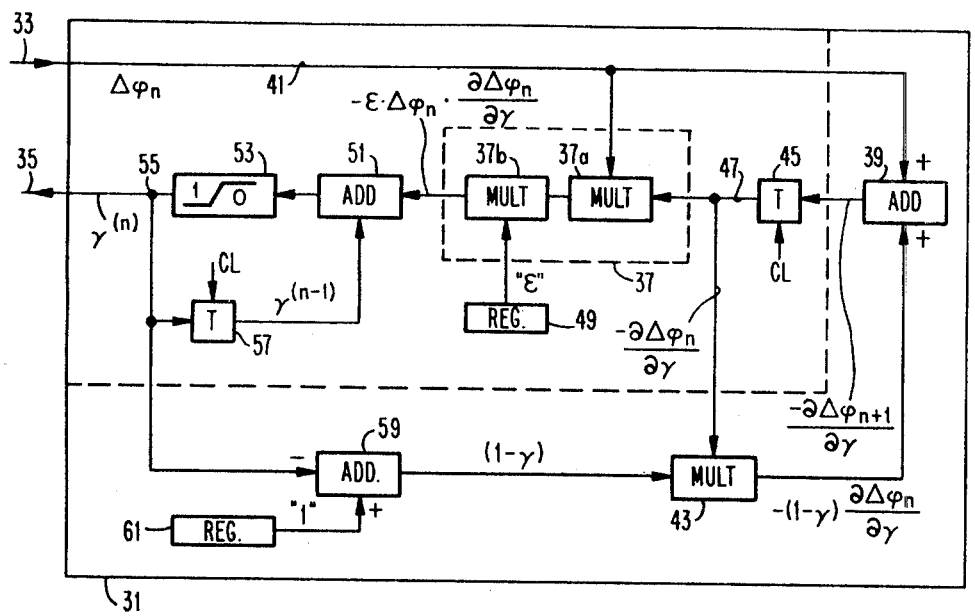
FIG. 4 illustrates in block form the details of a circuit arrangement according to the invention for adaptively determining the gain factor in lieu of the phase error predictor of FIG. 3.

Gain adjustment circuitry 31, FIG. 4, receives residual phase error values $\Delta\phi_n$ (from phase difference determination means 21) on input 33. If furnishes on output 35 the current gain value $\gamma^{(n)}$ which is transferred to phase error predictor (loop filter) 23 as input value.

It is to be understood that all values in gain adjustment circuitry 31 such as $\Delta\phi_n$ or $\gamma$ are real values. It can further be assumed that the values are represented digitally, e.g., in coded binary representation. Thus, each single line shown in FIG. 4 would actually consist of $k$ parallel bit lines for transferring in parallel the $k$ bits of each code word representing a value $\Delta\phi_n$, $\gamma$, etc. Of course, any other representation, e.g., bit-sequential or analog, could be chosen for the values in gain adjustment circuitry 31.

Clock signal CL generated in clock recovery means 13 is furnished to elements 45 and 57 in gain adjustment circuitry 31 to obtain time-discrete operation.

Input 33 is connected to a multiplier unit 37 and an adder element 39 by a bus 41. A second input of adder 39 is connected to the output of multiplier element 43. The output of adder 39 is connected to the input of a delay element (T) 45, which may be a $k$-bit register for holding one single value. It has an input for clock signal CL. Upon occurrence of a clock pulse, it furnishes the stored value at its output 47 which is connected to a second input of multiplier unit 37 and to a first input of multiplier element 43; it then stores a new value received at its input from adder 39.

Multiplier unit 37 has a third input to which a constant value $\epsilon$ is applied, e.g., from a register 49. Multiplier unit 37 provides the product of $\epsilon$, $\Delta\phi_n$ and the output of delay element 45. This product is transferred to an adder element 51. Multiplier unit 37 may actually consist of two multipliers 37a and 37b each for two input values, which are connected in series as shown in FIG. 4. In digital implementation, the multiplication by small value $\epsilon$ may simply consist in a shift-right operation (multiplication by $\epsilon = 2^{-e}$, e being a positive integer).

The output of adder 51 is connected to a limiter circuit 53. The output of this circuit of which no values less than zero or greater than one can appear is connected through a bus 55 to the output 35 of the gain adjustment unit. A delay element 57 (T) is connected in a feedback loop between output 55 of the limiter and a second input of adder 51. It also has an input for the clock signal CL, and its design and function are equivalent to that of delay element 45.

An adder/subtractor 59 and a register 61 furnishing a constant value "1" are provided for generating the complement $1 - \gamma$. One input of adder/subtractor 59 (subtrahend input) is connected to line 55, i.e., to the output of the limiter circuit 53, and the other to the output of constant value register 61. The output of adder/subtractor 59 is connected to a second input of multiplier 43. Thus, a second feedback loop exists for processing the values on lines 47 and 55 and delivering a combined value back to one input of adder 39.

All of the functional elements of gain adjustment unit 31, i.e., adders, multipliers, delay units (clocked registers) and limiter for binary coded digital values are well known and therefore need not be described here in more detail.

Operation of the unit shown in FIG. 4 is now explained in connection with equations (6) and (9). Adder 51 receives the last-previous gain value, i.e., $\gamma^{(n-1)}$, from delay unit 57 on one of its inputs, and a product $$-\epsilon \cdot \Delta\phi_n \cdot \frac{\delta\Delta\phi_n}{\delta\gamma}$$

from multiplier 37 on its other input to generate $$\gamma^{(n)} = \gamma^{(n-1)} - \epsilon \cdot \Delta\phi_n \cdot \frac{\delta\Delta\phi_n}{\delta\gamma}$$

on its output (cf. equation (6)). As the gain value must be between 0 and 1, $\gamma^{(n)}$ is restricted by limiter unit 53 to this range. The term $$\frac{-\delta\Delta\phi_n}{\delta\gamma}$$

which appears on input line 47 of multiplier 37 corresponds to $$-(1-\gamma)\frac{\delta\Delta\phi_{n-1}}{\delta\gamma} + \Delta\phi_{n-1}$$

(cf. equation (9), signs inverted). The signal for the second partial term $\Delta\phi_{n-1}$ is contributed from input 33 through adder 39 and delay unit 45 to line 47 at the input of multiplier 37. The signal for the first term $$-(1-\gamma) \cdot \frac{\delta\Delta\phi_{n-1}}{\delta\gamma}$$

is developed by subtracting $\gamma$ from "1" in adder/substractor element 59, multiplying the result by $$-\frac{\delta\Delta\phi_{n-1}}{\delta\gamma}$$

at time $n-1$ in multiplier element 43 and feeding this product back through adder 39 and delay unit 45 to line 47 at the input of multiplier 37.

The value of $\epsilon$ determines the speed of convergence, i.e., how fast optimum setting of gain $\gamma$ will be achieved. It was found that for $\epsilon$ values from 0.125 to 0.25 ($2^{-3}$ to $2^{-2}$) should be used for obtaining fast convergence.

Figure 5:
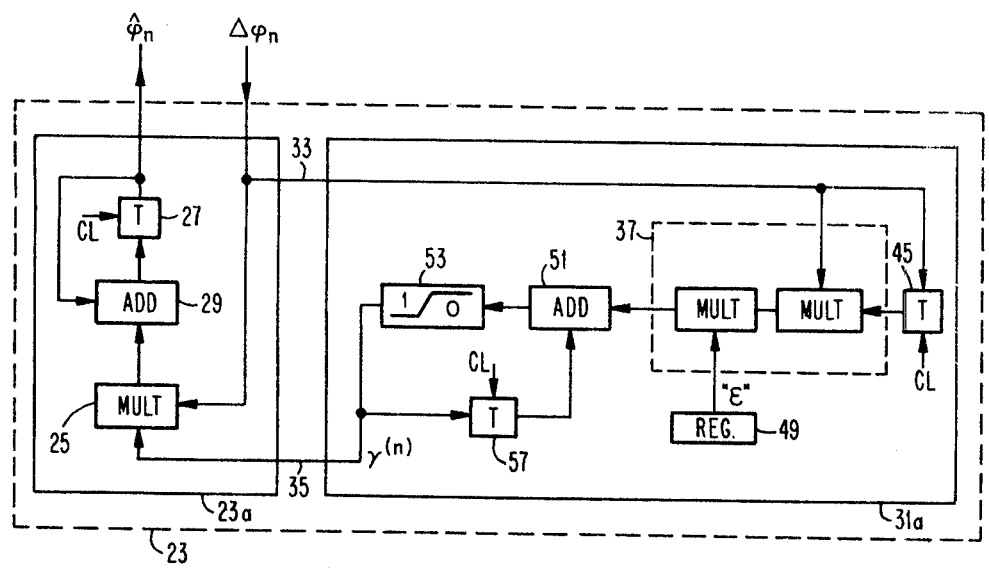
FIG. 5 illustrates in block form the details of an alternative simplified embodiment of the invention in a phase corrector feedback loop comprising a phase error predictor.

An alternative embodiment of the gain adjustment unit is shown in FIG. 5. It is a simplified version of the one just described in connection with FIG. 4. FIG. 5 represents the complete phase error predictor 23, comprising:

(a) prior art loop filter 23a without adaptive gain setting, as shown in FIG. 3, for providing $\hat{\phi}_n = \hat{\phi}_{n-1} + \Delta\phi_{n-1}$, and (b) a simplified gain adjustment unit 31a.

As will be seen when comparing FIGS. 4 and 5, the simplified unit 31a is obtained by omitting the elements to the right and below the dashed line of unit 31 in FIG. 4. It can easily be verified when studying equations (6) and (9) in connection with these figures, that a term for defining the simpler circuit 31a of FIG. 5 is obtained by omitting in equation (9) the term $$(1-\gamma)\frac{\delta\Delta\phi_{n-1}}{\delta\gamma},$$

which leads to the following simpler equation for recursive determination of the value for $\gamma$:

$$\gamma^{(n)} = \gamma^{(n-1)} + \epsilon \cdot \Delta\phi_n \cdot \Delta\phi_{n-1} \quad (10)$$

An intuitive explanation of equation (10) is the following: If successive values of $\Delta\phi_n$ are uncorrelated, i.e., the average value $\overline{\Delta\phi_n\Delta\phi_{n-1}} = 0$, then the value of $\gamma$ is just optimum. If, however, there is positive correlation, i.e., $\overline{\Delta\phi_n\Delta\phi_{n-1}} > 0$, then $\gamma$ is not large enough. Carrier phase tracking does not follow the phase jitter rapidly enough; hence $\gamma$ must be increased. Otherwise, if $\gamma$ is too large, an average overcompensation of the phase jitter results which leads to a negative correlation of successive residual phase errors.

The simplified gain adjustment unit according to FIG. 5 is slightly inferior to the first described embodiment with respect to speed of convergence but eventually provides the optimum value of $\gamma$.

To conclude, an additional possibility for improvement of the gain adjustment unit should be mentioned. If in the phase error predictor 23 (FIG. 3) a second, parallel loop is provided with duplicate cumulation and a fixed gain factor $\gamma$ (for completely compensating a carrier frequency shift), gain factor $\gamma$ must be adapted accordingly in order to obtain correct results even in case of frequency shift.

For this purpose, the arrangement of FIG. 4 would be supplemented by a loop between line 47 and a third input of adder 39. This loop would include a multiplier for multiplying the signal on line 47 by $-\zeta$, and further an accumulator arrangement consisting of adder and delay element, for accumulating the products furnished by the multiplier, and for providing the accumulated value to a third input of adder 39.

The following four cases illustrate the effect of an adaptive setting of the gain factor to an optimum value.

| CASE | SNR (dB) | $\alpha$ | $\gamma$ | $P_{BER}$ |
|---|---|---|---|---|
| A | 22 | 0.25 | 0.390* | $2.3 \cdot 10^{-4}$ |
| B | 22 | 0.25 | 0.828 | $5.6 \cdot 10^{-4}$ |
| C | 27 | 4.0 | 0.828* | $1.7 \cdot 10^{-4}$ |
| D | 27 | 4.0 | 0.390 | $1.2 \cdot 10^{-3}$ |

SNR = $1/\sigma_w^2$ signal-to-noise ratio
$\alpha$ phase jitter-to-noise ratio according to equation (3)
$\gamma$ gain factor in feedback loop; $\gamma^*$ = optimum value according to equation 4
$P_{BER}$ bit error probability; determined by similation (modulation: 8-PSK)

In cases A and C, the optimum value for $\gamma$ which is determined by equation (4) for a given value of $\alpha$, was chosen. The optimum value is automatically obtained by the arrangement of the present invention. Cases B and D, however, illustrate what happens if fixed values are chosen for $\gamma$ which are only optimum for particular given conditions (i.e., cases A and C), but will not be optimum for a different $\alpha$. Bit error probability is considerably higher for cases B and D.

While the invention has been particularly shown and described with reference to preferred embodiments thereof, it will be understood by those skilled in the art that various changes in form and details may be made therein without departing from the spirit and scope of the invention.

What is claimed is:

1. A circuit for adaptively generating a gain control factor ($\gamma$) for use in a phase error predictor circuit which includes circuit means responsive to the gain control factor ($\gamma$) for deriving an estimated phase error value ($\hat{\phi}n$) and said error predictor circuit being part of a feedback loop of a phase error compensating circuit in a receiver for receiving discrete data values under clock control which have been transmitted by modulating a carrier at discrete clock times, said receiver including; a phase correction circuit for correcting the phase of a previously equalized received signal ($x_n$) in accordance with said estimated phase error value ($\hat{\phi}n$) and providing a phase corrected received signal ($y_n$), a decision circuit responsive to said phase corrected received signal ($y_n$) for providing output data signals ($\hat{a}_n$) from said phase corrected values ($y_n$), and a feedback loop including a phase difference determining circuit responsive to the phase corrected received signal ($y_n$) and the output data signals ($\hat{a}_n$) for providing successive values of the residual phase error ($\Delta\phi_n$) and a phase error predictor circuit for providing the said estimated phase error value ($\hat{\phi}_n$); said phase error predictor circuit including a circuit for adaptively generating a gain factor ($\gamma$) and comprises:

first circuit means responsive to successive values of the residual phase error ($\Delta\phi_n$) for forming the product of the present residual phase error, a function of the previous residual phase error ($\Delta\phi_{n-1}$) and a given fixed value ($\epsilon$) which is arbitrarily set between the value 0 and 1, second circuit means for forming the sum of the product provided by the said first circuit means and a previous sum (gain factor $\gamma^{n-1}$) of the said second circuit means; and third circuit means responsive to the sum provided by said second circuit means for limiting the output (gain factor $\gamma$) to a range between 0 and 1.

2. A circuit for adaptively generating a gain control factor ($\gamma$) for use in a phase error predictor circuit circuit which includes circuit means responsive to the gain control factor ($\gamma$) for deriving an estimated phase error value ($\hat{\phi}n$) and said error predictor circuit being part of a feedback loop of a phase error compensating circuit in a receiver for receiving discrete data values under clock control which have been transmitted by modulating a carrier at discrete clock times, said receiver including; a phase correction circuit for correcting the phase of a previously equalized received signal ($x_n$) in accordance with said estimated phase error value ($\hat{\phi}n$) and providing a phase corrected received signal ($y_n$), a decision circuit responsive to said phase corrected received signal ($y_n$) for providing output data signals ($\hat{a}_n$) from said phase corrected values ($y_n$), and a feedback loop including a phase difference determining circuit responsive to the phase corrected received signal ($y_n$) and the output data signals ($\hat{a}_n$) for providing successive values of the residual phase error ($\Delta\phi_n$) and a phase error predictor circuit for providing the said estimated phase error value ($\hat{\phi}_n$); said phase error predictor circuit including a circuit for adaptively generating said gain factor ($\gamma$) and having an input line for receiving said residual phase error signal ($\Delta\phi_n$) and an output line for supplying said gain factor signal ($\gamma^{(n)}$) and comprising:

first adder means receiving at a first input signal values from the input line;

a first delay element connected to an output of said first adder means for delaying the output signal of the first adder by one clock period;

first multiplying means for providing the product of the signals from the input line, the output of the first delay element, and a given fixed value ($\epsilon$) between 0 and 1;

a second delay element connected to the output line for delaying the signal on that line by one clock period;

a second adder means for adding the output signal values of said first multiplying means and said second delay element;

limiter means for limiting the output signal of said second adder means to a value between 0 and 1 and providing its output to the output line;

adder/subtractor means for subtracting from "one," the value of the signal on the output line;

and second multiplying means receiving input signals from the outputs of said first delay element and said adder/subtractor means for providing the product thereof to a second input of said first adder means.

3. The circuit of claim 2 in which the value of ($\epsilon$) is fixed somewhere between 0.12 and 0.26.

4. The circuit of claim 2 in which the value of ($\epsilon$) is a negative power of two, preferably $2^{-2}$ or $2^{-3}$.

5. A circuit for adaptively generating a gain control factor ($\gamma$) for use in a phase error predictor circuit which includes circuit means responsive to the gain control factor ($\gamma$) for deriving an estimated phase error value ($\hat{\phi}n$) and said error predictor circuit being part of a feedback loop of a phase error compensating circuit in a receiver for receiving discrete data values under clock control which have been transmitted by modulating a carrier at discrete clock times, said receiver including; a phase correction circuit for correcting the phase of a previously equalized received signal ($x_n$) in accordance with said estimated phase error value ($\hat{\phi}n$) and providing a phase corrected received signal ($y_n$), a decision circuit responsive to said phase corrected received signal ($y_n$) for providing output data signals ($\hat{a}_n$) from said phase corrected values ($y_n$), and a feedback loop including a phase difference determining circuit responsive to the phase corrected received signal ($y_n$) and the output data signals ($\hat{a}_n$) for providing successive values of the residual phase error ($\Delta\phi_n$) and a phase error predictor circuit for providing the said estimated phase error value ($\hat{\phi}_n$); said phase error predictor circuit including a circuit for adaptively generating said gain factor ($\gamma$) and having an input line for receiving said residual phase error signal ($\Delta\phi_n$) and an output line for supplying said gain factor signal ($\gamma^{(n)}$) and comprising:

a first delay element connected to the input line for delaying the signal on the input line by one clock period;

multiplying means for multiplying the signal value on the input line by the output signal value of the first delay element and by a factor $\epsilon$ which is arbitrarily set between the value 0 and 1;

a second delay element connected to the output line for delaying the signal ($\gamma^{(n)}$) on the output line by one clock period to provide the signal ($\gamma^{(n-1)}$);

adder means for adding the output signal value of the multiplying means and the second delay element; and limiter means for limiting the output signal from the adder means to a range between 0 and 1 and having its output connected to the output line.

6. A circuit for adaptively generating a gain control factor ($\gamma$) for use in a phase error predictor circuit which includes circuit means responsive to the gain control factor ($\gamma$) for deriving an estimated phase error value ($\hat{\phi}n$) and said error predictor circuit being part of a feedback loop of a phase error compensating circuit in a receiver for receiving discrete data values under clock control which have been transmitted by modulating a carrier at discrete clock times, said receiver including; a phase correction circuit for correcting the phase of a previously equalized received signal ($x_n$) in accordance with said estimated phase error value ($\hat{\phi}n$) and providing a phase corrected received signal ($y_n$), a decision circuit responsive to said phase corrected received signal ($y_n$) for providing output data signals ($\hat{a}_n$) from said phase corrected values ($y_n$), and a feedback loop including a phase difference determining circuit responsive to the phase corrected received signal ($y_n$) and the output data signals ($\hat{a}_n$) for providing successive values of the residual phase error ($\Delta\phi_n$) and a phase error predictor circuit for providing the said estimated phase error value ($\hat{\phi}_n$); said phase error predictor circuit including a circuit for adaptively generating a gain factor ($\gamma$) and comprises:

signal generating means responsive to the said residual phase error ($\Delta\phi_n$) and the gain factor ($\gamma^{(n)}$) for providing an intermediate signal value $$\left(\frac{-\delta\Delta\phi_n}{\delta\gamma}\right)$$

which represents the change of the residual phase error;

multiplier circuit means for providing the product of the present residual phase error ($\Delta\phi_n$), a fixed value $\epsilon$ which resides between 0 and 1, and the said intermediate signal value $$\left(\frac{-\delta\Delta\phi_n}{\delta\gamma}\right);$$

and adder circuit means for adding the previous gain factor $\gamma^{(n-1)}$ to the output of the said multiplier circuit means to derive the said adaptive gain factor ($\gamma^{(n)}$).

* * * * *